United States Patent
Yamasaki et al.

(10) Patent No.: US 9,228,648 B2
(45) Date of Patent: Jan. 5, 2016

(54) ELECTRIC LINEAR MOTION ACTUATOR AND ELECTRIC BRAKE SYSTEM

(71) Applicants: Tatsuya Yamasaki, Shizuoka (JP); Yui Masuda, Shizuoka (JP); Makoto Muramatsu, Shizuoka (JP); Masaaki Eguchi, Shizuoka (JP); Yuki Saoyama, Shizuoka (JP)

(72) Inventors: Tatsuya Yamasaki, Shizuoka (JP); Yui Masuda, Shizuoka (JP); Makoto Muramatsu, Shizuoka (JP); Masaaki Eguchi, Shizuoka (JP); Yuki Saoyama, Shizuoka (JP)

(73) Assignee: NTN Corporation, Osaka (JP)

(*) Notice: Subject to any disclaimer, the term of this patent is extended or adjusted under 35 U.S.C. 154(b) by 0 days.

(21) Appl. No.: 14/354,173

(22) PCT Filed: Oct. 23, 2012

(86) PCT No.: PCT/JP2012/077305
§ 371 (c)(1),
(2) Date: Apr. 25, 2014

(87) PCT Pub. No.: WO2013/061948
PCT Pub. Date: May 2, 2013

(65) Prior Publication Data
US 2014/0262634 A1    Sep. 18, 2014

(30) Foreign Application Priority Data
Oct. 26, 2011 (JP) .................................. 2011-234980

(51) Int. Cl.
*B60T 13/74* (2006.01)
*F16H 25/22* (2006.01)
(Continued)

(52) U.S. Cl.
CPC ............ *F16H 25/2252* (2013.01); *F16D 55/00* (2013.01); *F16D 65/14* (2013.01);
(Continued)

(58) Field of Classification Search
USPC ........................ 188/1.11 E, 1.11 L, 156–164
See application file for complete search history.

(56) References Cited

U.S. PATENT DOCUMENTS 6,000,507 A * 12/1999 Bohm et al. .................. 188/158
6,059,076 A *  5/2000 Dietrich et al. .............. 188/156
(Continued)

FOREIGN PATENT DOCUMENTS

| CN | 1466528 | 1/2004 |
| EP | 1 124 073 | 8/2001 |

(Continued)

OTHER PUBLICATIONS

Extended European Search Report dated Jun. 18, 2015 issued in corresponding European Patent Application No. 12842825.7.
(Continued)

*Primary Examiner* — Christopher Schwartz
(74) *Attorney, Agent, or Firm* — Wenderoth, Lind & Ponack, L.L.P.

(57) ABSTRACT

An electric linear motion actuator is provided which can set the clearance during normal braking operation of an electric brake system. The linear motion actuator includes a load sensor for detecting the magnitude of the load with which a friction pad is pressed against the brake disk, a temperature sensor for compensating for the influence of temperature on the load sensor, and an electronic control unit. The electronic control unit is adapted to calculate a target rotational angle from the position of the electric motor corresponding to the magnitude of the load detected by the load sensor to the position of the electric motor where the clearance is at a predetermined value, and control the electric motor to rotate the electric motor by the target rotational angle.

20 Claims, 10 Drawing Sheets

(51) Int. Cl.

| | | |
|---|---|---|
| *F16D 55/00* | (2006.01) | |
| *F16D 65/14* | (2006.01) | |
| *F16D 65/18* | (2006.01) | |
| *F16D 65/62* | (2006.01) | |
| *F16D 65/68* | (2006.01) | |
| *F16H 25/20* | (2006.01) | |
| *F16D 66/00* | (2006.01) | |
| *F16D 121/24* | (2012.01) | |
| *F16D 125/36* | (2012.01) | |
| *F16D 125/40* | (2012.01) | |
| *F16D 125/48* | (2012.01) | |

(52) U.S. Cl.
CPC ............... *F16D 65/18* (2013.01); *F16D 65/62* (2013.01); *F16D 65/68* (2013.01); *F16H 25/2021* (2013.01); *F16D 2066/003* (2013.01); *F16D 2066/005* (2013.01); *F16D 2121/24* (2013.01); *F16D 2125/36* (2013.01); *F16D 2125/40* (2013.01); *F16D 2125/48* (2013.01); *F16H 25/2204* (2013.01)

(56) References Cited

U.S. PATENT DOCUMENTS

| | | | |
|---|---|---|---|
| 6,748,310 B2 * | 6/2004 | Tamasho et al. | 701/70 |
| 6,810,316 B2 * | 10/2004 | Yokoyama et al. | 701/70 |
| 2004/0104618 A1 | 6/2004 | Yamamoto et al. | |
| 2004/0187591 A1 | 9/2004 | Baumann et al. | |
| 2006/0169548 A1 * | 8/2006 | Corbett et al. | 188/72.8 |
| 2009/0152054 A1 * | 6/2009 | Baumgartner et al. | 188/34 |
| 2009/0218179 A1 * | 9/2009 | Yokoyama et al. | 188/1.11 L |
| 2010/0320043 A1 | 12/2010 | Yamasaki et al. | |

FOREIGN PATENT DOCUMENTS

| | | |
|---|---|---|
| JP | 2000-213575 | 8/2000 |
| JP | 2001-159436 | 6/2001 |
| JP | 2003-106355 | 4/2003 |
| JP | 2004-060867 | 2/2004 |
| JP | 2004-124950 | 4/2004 |
| JP | 2004-153924 | 5/2004 |
| JP | 2004-239324 | 8/2004 |
| JP | 2004-301835 | 10/2004 |
| JP | 2005-106487 | 4/2005 |
| JP | 4000675 | 10/2007 |
| JP | 2010-203561 | 9/2010 |
| JP | 2011-094755 | 5/2011 |

OTHER PUBLICATIONS

International Search Report issued Jan. 8, 2013 in International (PCT) Application No. PCT/JP2012/077305.

Written Opinion of the International Searching Authority issued Jan. 8, 2013 in corresponding PCT/JP2012/077305 (with English translation).

Chinese Office Action dated Oct. 26, 2015 issued in counterpart Chinese Patent Application No. 201280058078.8 (with Partial English Translation).

* cited by examiner

ELECTRIC LINEAR MOTION ACTUATOR AND ELECTRIC BRAKE SYSTEM

TECHNICAL FIELD

This invention relates to an electric linear motion actuator capable of converting the rotary motion of a rotary shaft driven by an electric motor to a linear motion of a linear motion member, thereby pressing an object with the linear motion member, and an electric brake system including such an electric linear motion actuator.

BACKGROUND ART

Many of older vehicle brake systems are hydraulic brake systems, which include a brake disk and friction pads driven by hydraulic cylinders and pressed against the brake disk. But with the recent introduction of new brake control systems such as anti-lock brake systems (ABS), electric brake systems, which do not use hydraulic circuits, are gathering much attention.

An electric brake system includes an electric linear motion actuator configured to covert the rotation of a rotary shaft driven by an electric motor to a linear motion of a linear motion member, thereby driving and pressing brake pads against a brake disk, thereby generating a braking force.

If the clearance between the friction pads and the brake disk, of the electric brake system, is too small, the friction pads may contact the brake disk, generating resistance, due e.g. to run-out of the brake disk. The resistance could reduce fuel economy of the vehicle or cause abnormal wear of the friction pads. If the clearance is too large, a longer time is needed until the friction pads come into contact with the brake disk. That is, response to braking is not good.

It is therefore necessary to adjust the clearance between the brake pads and the brake disk when the brake is released within a predetermined range. Electric brake systems disclosed in the below-identified Patent documents 1 and 2 are equipped with means for automatically adjusting the clearance between the brake pads and the brake disk.

PRIOR ART DOCUMENTS

Patent Documents

Patent document 1: JP Patent Publication 2010-203561A
Patent document 2: JP Patent 4000675B

SUMMARY OF THE INVENTION

Object of the Invention

The electric brake system disclosed in Patent document 1 is configured to set the clearance between the brake pads and the brake disk based on the position of the brake pads when the brake pads are pressed against the brake disk by applying a current of a predetermined magnitude, the electric motor is then stopped in this state, freeing the brake pads, and the brake pads are pushed back away from the brake disk by the reaction force when the motor is stopped until the brake pads stop naturally.

In this arrangement, in order to set the clearance, it is necessary to first apply a current of a predetermined magnitude to the electric motor. (This is a special procedure other than normal braking operations.) This procedure will pose no problem in a brake system for braking aircraft wheels, such as that disclosed in Patent document 1. But in a vehicle brake system, the time during which this special procedure can be performed is extremely limited.

The electric brake system disclosed in Patent document 2 includes a load sensor for detecting the magnitude of the load with which the brake disk is pressed, and a clearance control means for controlling the electric motor when pressure on the brake disk is released such that the clearance between the brake pads and the brake disk is at a predetermined value. This clearance control means is configured to set the clearance between the brake pads and the brake disk with reference to the position of the brake pads when the differentiated value of the output of the load sensor changes steeply and sharply while the brake pads are retracting, and is advantageous in that it is less likely to be affected by temperature.

But since the differentiated value of the output of the load sensor tends to unstable where the load is near zero, it is practically difficult to stably pinpoint the timing when the differentiated value changes steeply and sharply.

An object of the present invention is to provide an electric linear motion actuator which can set the clearance during normal braking operation of an electric brake system.

Means for Achieving the Object

In order to achieve this object, the present invention provides an electric linear motion actuator comprising a rotary shaft configured to be driven by an electric motor, a linear motion device which converts the rotation of the rotary shaft to a linear motion of a linear motion member such that the linear motion member is pressed against an object, wherein the electric linear motion actuator further comprises a load sensor for detecting the magnitude of a load with which the linear motion member is pressed against the object, a temperature compensation means for compensating for the influence of temperature on the load sensor, and a clearance control means for adjusting the clearance between the linear motion member and the object to a predetermined value by controlling the electric motor when pressure on the object from the linear motion member is released, wherein the clearance control means is configured to calculate a target rotational angle from the position of the electric motor corresponding to the magnitude of the load detected by the load sensor to the position of the electric motor where the clearance is at the predetermined value, and control the electric motor to rotate the electric motor by the target rotational angle.

By using this electric linear motion actuator, it is possible to set the clearance to a predetermined value by controlling the electric motor to rotate the electric motor by a target rotational angle which is calculated based on the magnitude of the load detected by the load sensor, when pressure on the object is released. By using this electric linear motion actuator in an electric brake system, it is possible to adjust the clearance when the brake is released during normal braking operation. The temperature compensation means compensates for the influence of temperature on the load sensor, thus ensuring accurate setting of the clearance.

Preferably, the load sensor comprises a flange member configured to be deflected by a reaction force to the load with which the object is pressed, a magnetic sensor, and a magnetic target which generates magnetic fields, with the magnetic target arranged such that its position relative to the magnetic sensor changes when the flange member is deflected.

Since this load sensor is configured such that when the flange member is deflected by the reaction force to the load, the relative position between the magnetic target and the magnetic sensor changes, and the output signal of the magnetic sensor changes corresponding to the degree of change in the relative position, it is possible to detect the magnitude of the load based on the output signal of the magnetic sensor. Since this load sensor is configured to detect the magnitude of the load based on a change in the relative position between the magnetic target and the magnetic sensor, which are kept out of contact with other, the sensor is less likely to malfunction even if an impact load or a shear load is applied. This sensor thus shows high durability.

Preferably, the magnetic target comprises at least two permanent magnets each magnetized in a direction perpendicular to the relative movement direction in which the position of the magnetic sensor relative to the magnetic target changes, with the permanent magnets arranged such that opposite magnetic poles of the permanent magnets are aligned in the relative movement direction, and the magnetic sensor located in the vicinity of the boundary between the opposite magnetic poles.

With this arrangement, the output signal of the magnetic sensor changes sharply and steeply when the magnetic target and the magnetic sensor move relative to each other in the axial direction, but scarcely changes when the magnetic target and the magnetic sensor move relative to each other in a direction other than the axial direction. Thus, the output signal of the magnetic sensor is less likely to be influenced by external vibrations, so that it is possible to stably and accurately detect the magnitude of the load.

Alternatively, the load sensor may comprise a strain sensor provided on the linear motion member.

As the linear motion device, any of the following may be used:
(1) A planetary roller type linear motion device comprising a plurality of planetary rollers kept in rolling contact with the cylindrical surface on the outer periphery of the rotary shaft, a carrier supporting the planetary rollers so as to be rotatable about their respective axes while revolving around the rotary shaft, and prevented from axial movement, and an outer ring member surrounding the planetary rollers, wherein the outer ring member has on the inner periphery thereof a helical rib engaged in helical grooves or circumferential grooves formed in the outer peripheries of the respective planetary rollers;
(2) A ball-screw type linear motion device comprising a threaded shaft configured to rotate together with the rotary shaft, a nut surrounding the threaded shaft, and a plurality of balls disposed between a thread groove formed in the outer periphery of the threaded shaft and a thread groove formed in the inner periphery of the nut; and
(3) A ball-ramp type linear motion device comprising a rotary disk configured to rotate together with the rotary shaft, a linear motion disk provided in front of the rotary disk with respect to the axial direction and facing the rotary disk, and balls disposed between inclined grooves formed in the surface of the rotary disk facing the linear motion disk and inclined grooves formed in the surface of the linear motion disk facing the rotary disk.

If the linear motion actuator further includes a rotational angle detecting means for detecting the rotational angle of the electric motor, the clearance control means can be configured to rotate the electric motor in the pressure-reducing direction until the rotational angle detected by the rotational angle detecting means coincides with the target rotational angle. The rotational angle detecting means may be a resolver, a Hall element, or a power supply unit configured to estimate the rotational angle of the electric motor based on the voltage between the lines through which power is supplied to the electric motor.

The present invention also provides an electric brake system including the above-described electric linear motion actuator of which the brake disk is pressed by the linear motion member of the electric linear motion actuator.

Advantages of the Invention

By using this electric linear motion actuator, it is possible to set the clearance to a predetermined value by controlling the electric motor to rotate the electric motor by the target rotational angle which is calculated based on the magnitude of the load detected by the load sensor, when pressure on the object is released. By using this electric linear motion actuator in an electric brake system, it is possible to adjust the clearance when the brake is released during normal braking operation.

BRIEF DESCRIPTION OF THE DRAWINGS

FIG. 7($b$) is a graph showing the relationship between the rotational angle of the electric motor shown in FIG. 1 and the position of the outer ring member.

FIG. 12($b$) shows a state where the rotary disk and the linear motion disk rotate relative to each other from the state of FIG. 12($a$) such that the distance between the disks has increased.

DETAILED DESCRIPTION OF THE INVENTION

Figure 1:
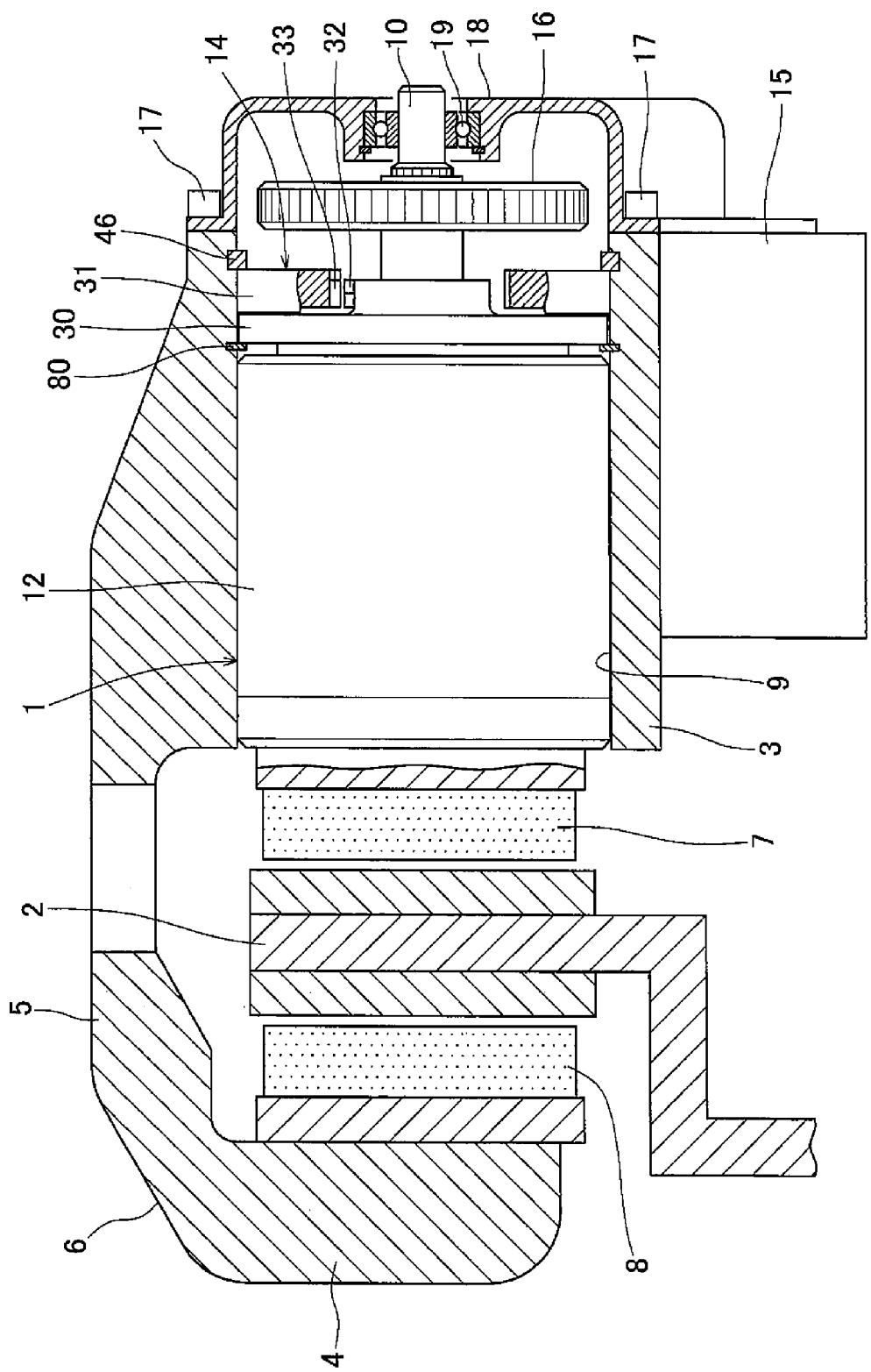
FIG. 1 is a sectional view of an electric brake system in which is mounted an electric linear motion actuator embodying the present invention.

FIG. 1 shows an electric brake system for a vehicle including an electric linear motion actuator 1 embodying the present invention. This electric brake system includes a brake disk 2 adapted to rotate together with a vehicle wheel, a caliper body 6 having opposed pieces 3 and 4 facing each other with the brake disk 2 therebetween, and a bridge 5 through which the opposed pieces 3 and 4 are coupled together, and a pair of right and left friction pads 7 and 8. The electric linear motion actuator 1 is mounted in a mounting hole 9 formed in the opposed piece 3 and open to the surface of the opposed piece 3 facing the brake disk 2, and a pair of right and left friction pads 7 and 8.

The friction pads 7 and 8 are disposed between the opposed piece 3 and the brake disk 2 and between the opposed piece 4 and the brake disk 2, respectively, and supported by a mount (not shown) fixed to a knuckle (not shown either) supporting the wheel so as to be movable in the axial direction of the brake disk 2. The caliper body 6 is also supported by the mount so as to be movable in the axial direction of the brake disk 2.

Figure 2:
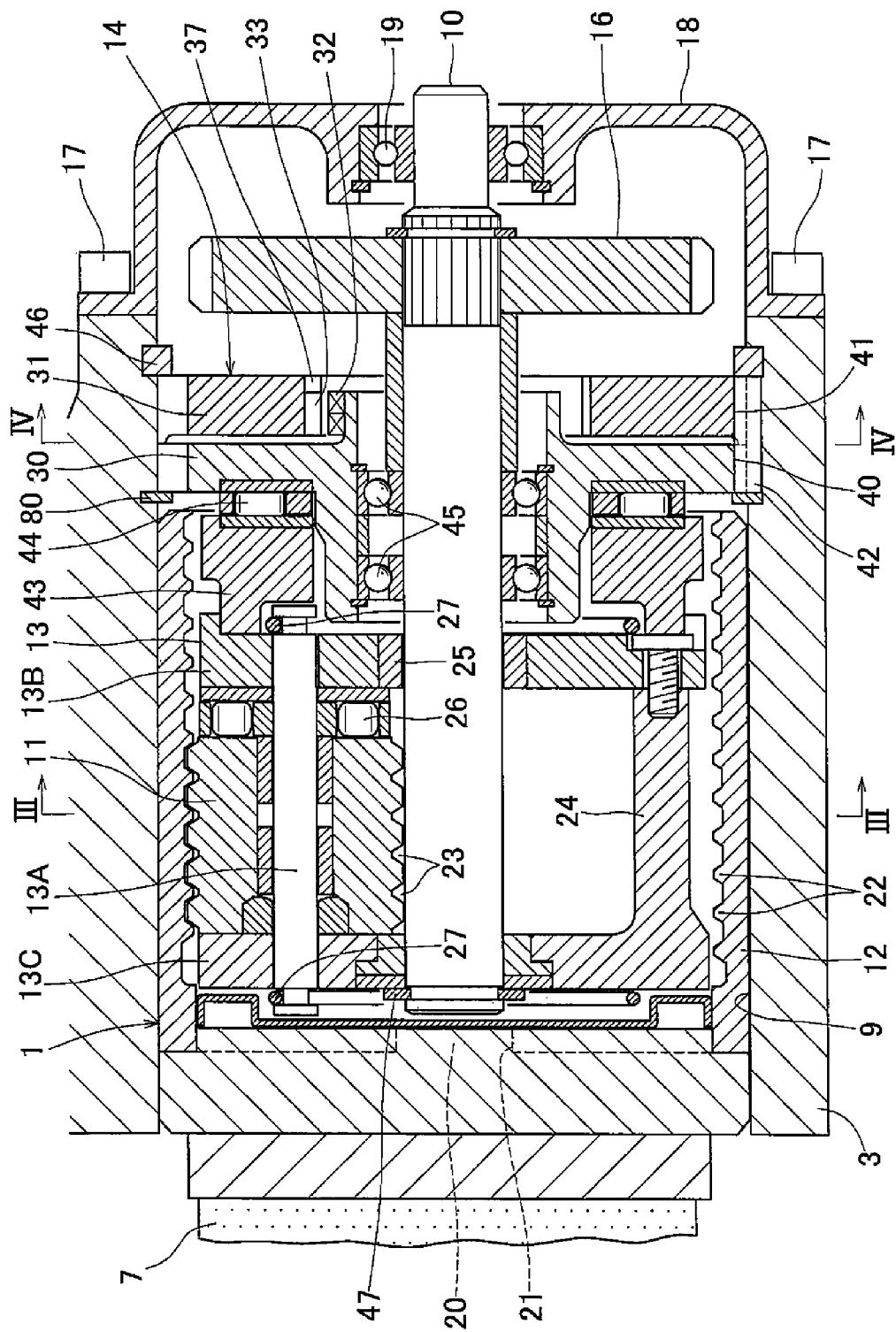
FIG. 2 is an enlarged sectional view of and around the electric linear motion actuator of FIG. 1.

As shown in FIG. 2, the electric linear motion actuator 1 includes a rotary shaft 10, a plurality of planetary rollers 11 kept in rolling contact with the cylindrical surface on the outer periphery of the rotary shaft 10, an outer ring member 12 surrounding the planetary rollers 11, a carrier 13 retaining the planetary rollers 11 so that the planetary rollers can rotate about their respective axes while revolving around the rotary shaft, and a load sensor 14 disposed axially rearward of the outer ring member 12.

The rotary shaft 10 is connected to an electric motor 15 shown in FIG. 1 through a gear 16, and is rotated by the electric motor 15. The rotary shaft 10 is received in the mounting hole 9, which axially extends through the opposed piece 3, such that the rear end of the rotary shaft 10 protrudes from the rear opening of the mounting hole 9. The gear 16 is mounted on the portion of the rotary shaft 10 protruding from the mounting hole 9 and is rotationally fixed to the rotary shaft 10 by means of splines. The gear 16 is covered by a lid 18 fixed in position by bolts 17 to close the rear opening of the mounting hole 9. A bearing 19 is mounted in the lid 18 to rotatably support the rotary shaft 10.

Figure 3:
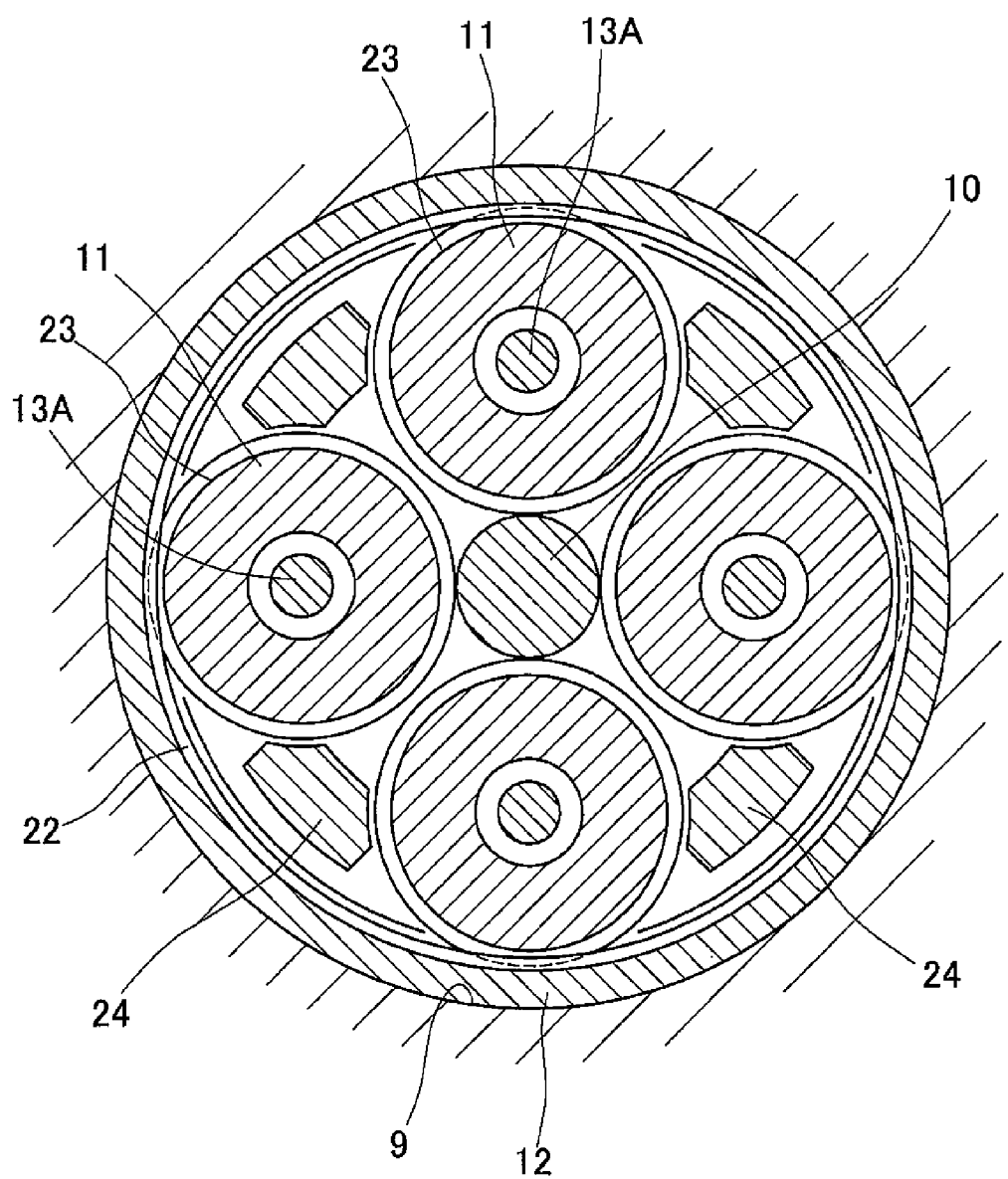
FIG. 3 is a sectional view taken along line III-III of FIG. 2.

As shown in FIG. 3, the planetary rollers 11 are kept in rolling contact with the cylindrical surface on the outer periphery of the rotary shaft 10 such that when the rotary shaft 10 rotates, the planetary rollers 11 also rotate due to friction between the planetary rollers 11 and the rotary shaft 10. The planetary rollers 11 are circumferentially spaced apart from each other at regular intervals.

As shown in FIG. 2, the outer ring member 12 is received in the mounting hole 9, which is formed in the opposed piece 3 of the caliper body 6, so as to be axially slidable along the wall of the mounting hole 9. The outer ring member 12 has engaging recesses 21 formed in the axial front end thereof in which engaging protrusions 20 formed on the backside of the friction pad 7 are engaged. By the engagement of the engaging protrusions 20 in the engaging recesses 21, the outer ring member 12 is rotationally fixed to the caliper body 6.

A helical rib 22 is formed on the inner periphery of the outer ring member 12. The helical rib 22 is engaged in circumferential grooves 23 formed in the outer periphery of each of the planetary rollers 11 such that when the planetary rollers 11 rotate, the outer ring member 12 is moved axially with the helical rib 22 of the outer ring member 12 guided by the circumferential grooves 23. In the embodiment, circumferential grooves 23, i.e. grooves having a lead angle of zero degrees are formed in the outer periphery of each planetary roller 11. But instead of such circumferential grooves 23, a helical groove having a different lead angle from the helical rib 22 may be formed.

The carrier 13 includes carrier pins 13A rotatably supporting the respective planetary rollers 11, an annular carrier plate 13C keeping the axial front ends of the carrier pins 13A circumferentially spaced apart at regular intervals, and an annular carrier body 13B keeping the axial rear ends of the carrier pins 13A circumferentially spaced apart at regular intervals. The carrier plate 13C and the carrier body 13B are axially opposed to each other with the planetary rollers 11 therebetween, and are coupled together by coupling rods 24 extending between the circumferentially adjacent planetary rollers 11.

The carrier body 13B is supported by the rotary shaft 10 through a slide bearing 25 so as to be rotatable relative to the rotary shaft 10. Thrust bearings 26 are mounted between the respective planetary rollers 11 and the carrier body 13B to prevent the rotation of the planetary rollers 11 about their respective axes from being transmitted to the carrier body 13B.

Compression ring springs 27 are each wrapped around the circumferentially spaced apart carrier pins 13A to radially inwardly bias the carrier pins 13A. Thus, under the biasing force of the compression ring springs 27, the outer peripheries of the planetary rollers 11 are pressed against the outer periphery of the rotary shaft 10, thus preventing slippage between the rotary shaft 10 and the planetary rollers 11. In order to apply the biasing force of the compression ring springs 27 over the entire axial lengths of the planetary rollers 11, one of the compression ring springs 27 is wrapped around first ends of the carrier pins 13A, while the other compression ring spring 27 is wrapped around the opposite second ends of the carrier pins 13A.

The load sensor 14 includes axially spaced apart and axially opposed flange member 30 and support member 31 which are both annular plate members, a magnetic target 32 which generates magnetic fields, and a magnetic sensor 33 for detecting the magnitude of magnetic fields. The load sensor 14 is fitted in the mounting hole 9 such that the support member 31 is located axially rearward of the flange member 30.

Figure 4:
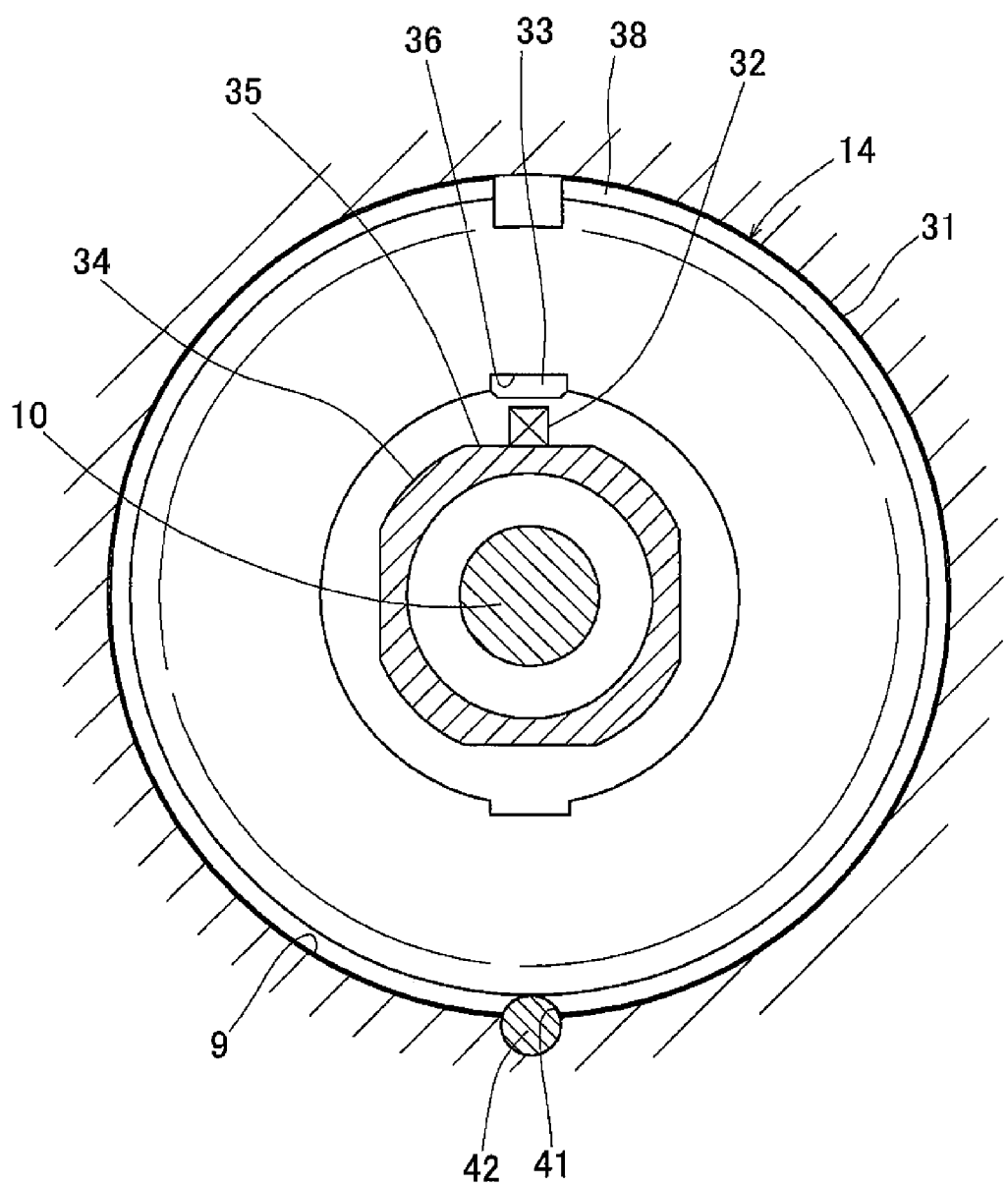
FIG. 4 is a sectional view taken along line IV-IV of FIG. 2.
Figure 5:
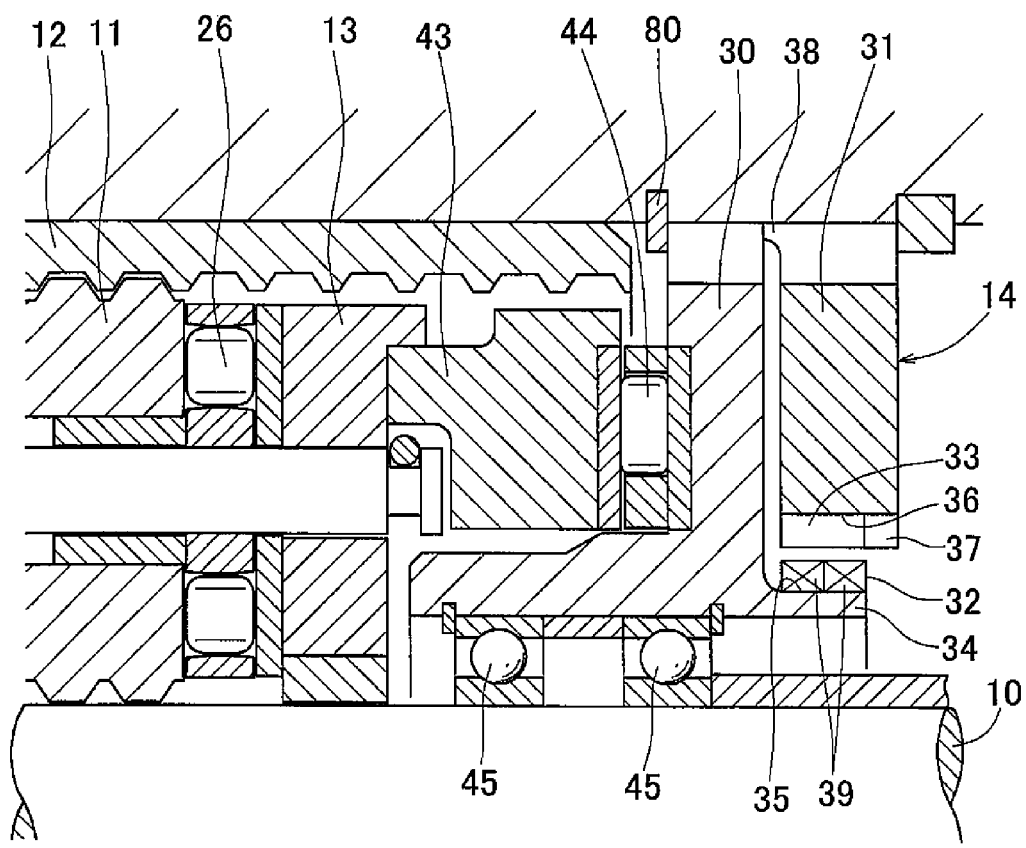
FIG. 5 is an enlarged sectional view of and around a load sensor of FIG. 2.

As shown in FIGS. 4 and 5, the flange member 30 has a tubular portion 34 protruding toward the support member 31. The tubular portion 34 has a radially outer surface radially facing the radially inner surface of the support member 31. The magnetic target 32 is fixed to a chamfer 35 formed on the radially outer surface of the tubular portion 34. The magnetic sensor 33 and a temperature sensor 37 are fixed in position in an axial groove 36 formed in the radially inner surface of the support member 31. The flange member 30 and the support member 31 are made of a magnetic material.

The support member 31 has an annular protrusion 38 on its surface facing the flange member 30 at the radially outer portion thereof. The annular protrusion 38 supports the radially outer portion of the flange member 30, thereby keeping the flange member 30 spaced apart from the body of the support member 31.

The magnetic target 32 comprises two permanent magnets 39 which are radially magnetized such that each magnet 39 has two poles at its radially inner and outer ends, respectively. The two permanent magnets 39 are arranged so that the two magnetic poles (i.e. N and S poles) of one of the magnets 39 are axially aligned with the respective poles of the other magnet 39 that are opposite in polarity.

If neodymium magnets are used as the permanent magnets 39, the magnets 39 can generate strong magnetic fields while taking up little space. This improves resolution of the load sensor 14. But as the permanent magnets 39, samarium-cobalt magnets, Alnico magnets, or ferrite magnets may be used instead. If samarium-cobalt magnets or Alnico magnets are used as the permanent magnets 39, the magnetic fields generated from the permanent magnets are less likely to decrease with a temperature rise of the permanent magnets 39. As the permanent magnets 39, praseodymium magnets or samarium-iron-nitride magnets may also be used.

The magnetic sensor 33 is arranged to face the magnetic target 32 in a direction perpendicular to the axial direction (radial direction in the figures), in the vicinity of the boundary between the adjacent magnetic poles of the two respective permanent magnets 39. As the magnetic sensor 33, a magnetic resistance element (or MR sensor) or a magnetic impedance element (or MI sensor) may be used. But a Hall IC is preferably used, because it is less expensive, and also because highly heat-resistant Hall ICs are now commercially available, and such heat-resistant Hall ICs can be advantageously used in electric brake systems.

The temperature sensor 37 detects the temperature in the vicinity of the load sensor 14. A thermocouple may be used as the temperature sensor 37. But preferably, a resistance thermometer sensor (thermistor) is used as the temperature sensor 37, because a resistance thermometer sensor can detect temperature with a smaller measurement error than a thermocouple, and can stably maintain high detection accuracy over a prolonged period of time.

As shown in FIG. 2, positioning grooves 40 and 41 both having a circular arc-shaped section are formed in the outer peripheries of the flange member 30 and the support member 31, respectively, at such positions that when a key member 42 is inserted into both grooves 40 and 41, the flange member 30 and the support member 31 are circumferentially positioned relative to each other such that the circumferential position of the magnetic target 32 coincides with that of the magnetic sensor 33.

Between the carrier 13 and the flange member 30, there are provided a spacer 43 rotatable together with the carrier 13, and a thrust bearing 44 through which axial loads are transmitted between the spacer 43 and the flange member 30. Rolling bearings 45 are fitted in the inner periphery of the flange member 30 and rotatably support the rotary shaft 10.

Snap rings 46 and 80 are fitted in the inner wall of the mounting hole 9, and engage the radially outer edge of the support member 31, preventing axial forward and rearward movements of the load sensor 14. The load sensor 14 supports the carrier body 13B in the axial direction through the spacer 43 and the thrust bearing 44, thereby preventing axial rearward movement of the carrier 13. A snap ring 47 is fitted on the rotary shaft 10 at its axial front end to prevent axial forward movement of the carrier 13. As a result, the carrier 13 is prevented from both axially forward and axially rearward movements, so that the planetary rollers 11, held in position by the carrier 13, are also prevented from axial movement.

A rotational angle detecting means 48 is mounted in the electric motor 15 which detects the rotational angle of the electric motor 15. The rotational angle detecting means 48 may be a resolver or a Hall IC. Alternatively, the rotational angle detecting means 48 may be a power supply unit capable of estimating the rotational angle based on the voltage between the lines through which power is supplied to the electric motor 15.

Figure 6:
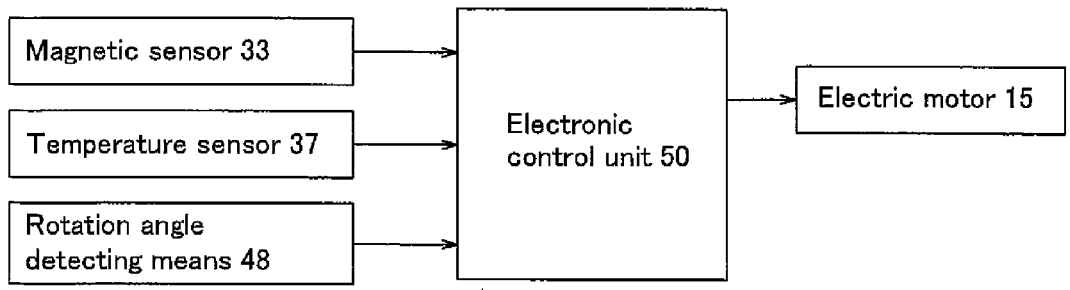
FIG. 6 is a block diagram of an electronic control unit for controlling an electric motor shown in FIG. 1.

The electric motor is controlled by an electronic control unit 50 shown in FIG. 6. To the electronic control unit 50, a signal corresponding to the magnitude of the load with which the brake disk 2 is pressed is applied from the magnetic sensor 33, a signal corresponding to the temperature around the magnetic sensor 33 is applied from the temperature sensor 37, and a signal corresponding to the rotational angle of the electric motor 15 is applied from the rotational angle detecting means 48. The electronic control unit 50 generates a control signal for controlling the rotational angle of the electric motor 15.

The electronic control unit 50, which processes the output signal of the magnetic sensor 33, has a temperature compensation function, i.e. the function of compensating for the influence of temperature on the magnetic sensor 33 based on the output signal of the temperature sensor 37. The temperature compensation function acts to correct the output signal of the magnetic sensor 33 to compensate for any reduction in magnetic fields generated from the permanent magnets 39 due to an increase in temperature of the permanent magnets 39.

The operation of the electric linear motion actuator 1 is now described.

When the electric motor 15 is energized, the rotary shaft 10 is rotated by the motor 15, and the planetary rollers 11 revolve around the rotary shaft 10 while rotating about the respective carrier pins 13A. This causes relative movement between the outer ring member 12 and the planetary rollers 11 due to engagement of the helical rib 22 in the circumferential grooves 23. But since the planetary rollers 11, as well as the carrier 13, are prevented from axial movement, only the outer ring member 12 is actually moved in the axial direction with the planetary rollers 11 kept stationary in the axial direction. Thus, the electric linear motion actuator 1 is effective to covert the rotation of the rotary shaft 10, when driven by the electric motor 15, to the axial movement of the outer ring member 12, thereby pressing the friction pads 7 and 8 against the brake disk 2 by means of the outer ring member 12 and the opposed piece 4 of the caliper body 6. The electric brake system thus generates a braking force.

When the friction pad 7 is pressed against the brake disk 2, a reaction force to the load that presses the brake disk 2 is applied to the outer ring member 12. This reaction force is transmitted through the planetary rollers 11, carrier 13, spacer 43 and thrust bearing 44 to the flange member 30. The reaction force thus deflects the flange member 30 axially rearward, changing the relative position between the magnetic target 32 and the magnetic sensor 33. This in turn changes the output signal of the magnetic sensor 33. Thus, it is possible to detect the magnitude of the load that pressed the brake disk 2 based on the output signal of the magnetic sensor 33.

When the friction pad 7 is pressed against the brake disk 2, the distance by which the relative position between the magnetic target 32 and the magnetic sensor 33 changes is extremely small. For example, if the load pressing the brake disk 2 is 30 kN, the relative position between the magnetic target 32 and the magnetic sensor 33 changes only about 0.1 mm in the axial direction. But in this load sensor 14, since the plurality of permanent magnets 39 are arranged such that their opposite magnetic poles are aligned in the direction in which the relative position between the magnetic target 32 and the magnetic sensor 33 changes, and further the magnetic sensor 33 is positioned adjacent to the boundary between the adjacent opposite magnetic poles, the output signal of the magnetic sensor 33 changes sharply and steeply when the relative position between the magnetic target 32 and the magnetic sensor 33 changes. This makes it possible to detect the distance by which the relative position between the magnetic target 32 and the magnetic sensor 33 changes with high accuracy. Moreover, since this load sensor 14 detects the magnitude of the load applied using a change in relative position between the magnetic target 32 and the magnetic sensor 33, which are kept out of contact with each other, the load sensor 14 is less likely to malfunction even if an impact load or a shear load is applied thereto. The load sensor 14 is thus sufficiently durable.

If the clearance between the friction pads 7 and 8 and the brake disk 2, of this electric brake system is too small, the friction pads 7 and 8 may contact the brake disk 2, generating resistance, due e.g. to run-out of the brake disk 2. The resistance could reduce fuel economy of the vehicle or cause abnormal wear of the friction pads 7 and 8. If the clearance is too large, a longer time is needed until the friction pads 7 and 8 come into contact with the brake disk 2. That is, response to braking is not good.

Figure 8:
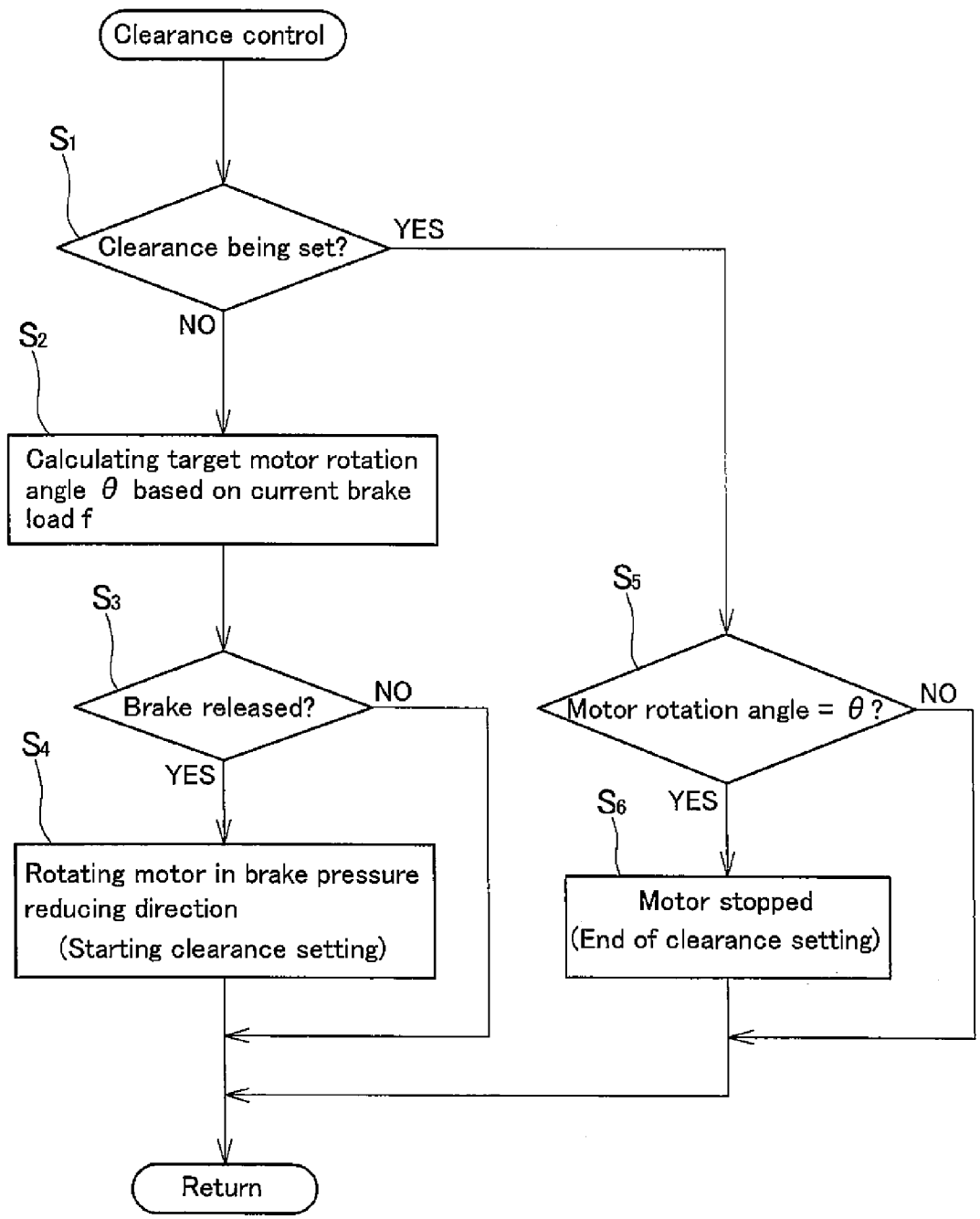
FIG. 8 is a flowchart of clearance control performed by the electronic control unit of FIG. 6.

According to the present invention, the electronic control unit 50 is configured to control the rotational angle of the electric motor 15 based on the magnitude of the load as detected by the load sensor 14 and the rotational angle of the electric motor 15 as detected by the rotational angle detecting means 48 so as to keep a predetermined clearance between the friction pads 7 and 8 and the brake disk 2, when the brake is released during normal braking operation. This clearance control is described with reference to the flowchart of FIG. 8.

When the brake is operated such that the friction pads 7 and 8 are pressed against the brake disk 2, based on the magnitude of the load detected by the load sensor 14 immediately before the pads are moved toward the brake disk, the electronic control unit 50 calculates the rotational angle $\theta$ of the electric motor 15 from the position of the electric motor 15 corresponding to the magnitude of the above load to a position of the electric motor 15 where the clearance between the friction pads 7 and 8 and the brake disk 2 is at a predetermined value (e.g. 0.5 mm) (Steps $S_1$ and $S_2$).

Figure 7:
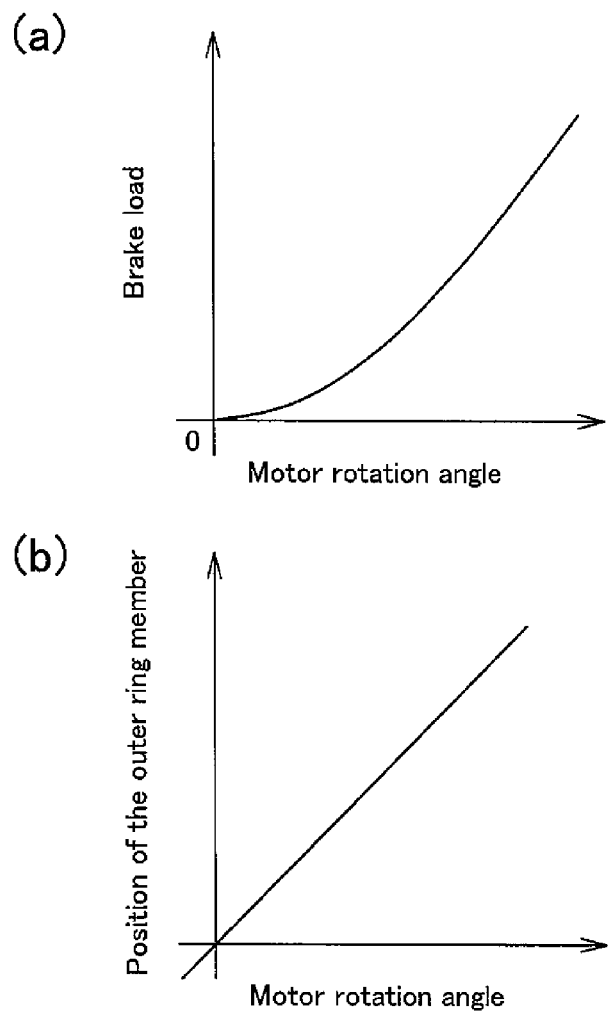
FIG. 7($a$) is a graph showing the relationship between the rotational angle of the electric motor shown in FIG. 1 and the brake load.

As shown in FIG. 7(*a*), it is possible to grasp beforehand the relationship between the rotational angle of the electric motor 15 and the load with which the brake disk 2 is pressed, by measuring these values beforehand. This relationship is determined by the rigidity of the caliper body 6 and the rigidities of the component parts of the electric linear motion actuator 1. As shown in FIG. 7(*b*), it is also possible to grasp beforehand the relationship between the rotational angle of the electric motor 15 and the position of the outer ring member 12, by measuring these values beforehand. This relationship is determined mainly by the conversion rate of the linear motion device for converting the rotary motion of the rotary shaft 10 to the linear motion of the outer ring member 12. Based on the above two relationships and the magnitude of the load detected by the load sensor 14, it is possible to calculate the rotational angle $\theta$ of the electric motor 15 until the electric motor 15 reaches a position where the clearance between the friction pads 7 and 8 and the brake disk 2 is at a predetermined value.

Next, when the brake is released by releasing pressure on the brake disk 2, the electric motor 15 is rotated in the pressure-reducing direction (direction in which the friction pad 7 moves away from the brake disk 2) to start setting the clearance (Steps $S_3$ and $S_4$).

After starting setting the clearance, the electric motor 15 is continuously rotated in the pressure-reducing direction until the rotational angle $\theta$, calculated in Step $S_2$, is reached, and when the rotational angle of the electric motor 15 as detected by the rotational angle detecting means 48 coincides with the rotational angle $\theta$, calculated in Step $S_2$, the electric motor 15 is stopped, thus finishing setting the clearance (Steps $S_5$ and $S_6$).

Thus, this electric brake system is configured such that the clearance can be set when the brake is released during normal braking operation.

When the friction pads 7 and 8 are pressed against the brake disk 2, frictional heat is generated between the friction pads 7 and 8 and the brake disk 2, which heats the area around the friction pads 7 and 8 to high temperature. Thus, if the load sensor 14 is provided in the vicinity of the members to be pressed against the brake disk (outer ring member 12, opposed piece 4, and friction pads 7 and 8), the load sensor 14 tends to be heated to high temperature and thus tends to be greatly influenced by fluctuations in temperature.

But in this electric brake system, since the load sensor 14 is provided axially rearwardly of the outer ring member 12, the distance of the load sensor 14 from the friction pads 7 and 8 is sufficiently long such that the area around the load sensor 14 is less likely to be heated to high temperature, so that the load sensor 14 is less likely to be influenced by fluctuations in temperature.

The magnetic sensor 33 of this electric brake system has a processing circuit including a temperature compensating portion capable of compensating for the influence of temperature on the magnetic sensor 33 based on the output signal of the temperature sensor 37, which permits more accurate adjustment of the clearance.

In the above embodiment, the electronic control unit is configured to calculate the rotational angle $\theta$ of the electric motor 15 from the position of the electric motor 15 while the brake is being applied to the position of the electric motor 15 where the clearance is at the predetermined value, and to control the electric motor 15 so that the electric motor 15 is rotated by the rotational angle $\theta$ when the brake is released thereafter. But instead, the rotational angle $\theta$ may be calculated as the rotational angle of the electric motor 15 from the position of the electric motor 15 when, after the brake has been released, the brake load as detected by the load sensor 14, which is decreasing, crosses a predetermined threshold, to the position of the electric motor 15 where the clearance is at the predetermined value.

In the above embodiment, in order to detect the relative movement between the magnetic target 32 and the magnetic sensor 33 with high accuracy, the magnetic target 32 is magnetized in a direction perpendicular to the direction in which the magnetic target 32 and the magnetic sensor 33 move relative to each other. But instead, the magnetic target 32 may be magnetized in the direction parallel to the direction in which the flange member 30 is deflected. In this case, the magnetic sensor 33 is provided in the vicinity of the magnetic target 32 to face the magnetic target 32 in the direction in which the magnetic target 32 is magnetized so that the load sensor can detect the clearance between the magnetic target 32 and the magnetic sensor 33, which changes when magnetic target 32 is deflected, in the form of fluctuations in the magnitude of magnetic fields.

In the above embodiment, in order to minimize the influence of frictional heat, the load sensor 14 is provided axially rearwardly of the members to be pressed against the brake disk (outer ring member 12, opposed piece 4, and friction pads 7 and 8). But instead, the load sensor 14 may be in the form of a strain sensor mounted to one of the friction pads 7 and 8. Also, the load sensor 14 may be a capacitance sensor, a reluctance sensor or an optical sensor.

In the above embodiment, the linear motion device for converting the rotation of the rotary shaft 10 to a linear motion of the linear motion member or members (outer ring member 12 and friction pad 7 in this embodiment) is a planetary roller mechanism comprising the plurality of planetary rollers 11 kept in rolling contact with the cylindrical surface on the outer periphery of the rotary shaft 10, the carrier 13 supporting the planetary rollers 11 so as to be rotatable about their respective axes while revolving around the rotary shaft, and prevented from axial movement, and the outer ring member 12 surrounding the planetary rollers 11, in which the outer ring member 12 has on its inner periphery the helical rib 22 engaged in the helical grooves or circumferential grooves 23 formed in the outer peripheries of the respective planetary rollers 11. But the present invention is applicable to a linear motion actuator including a different linear motion device too.

Figure 9:
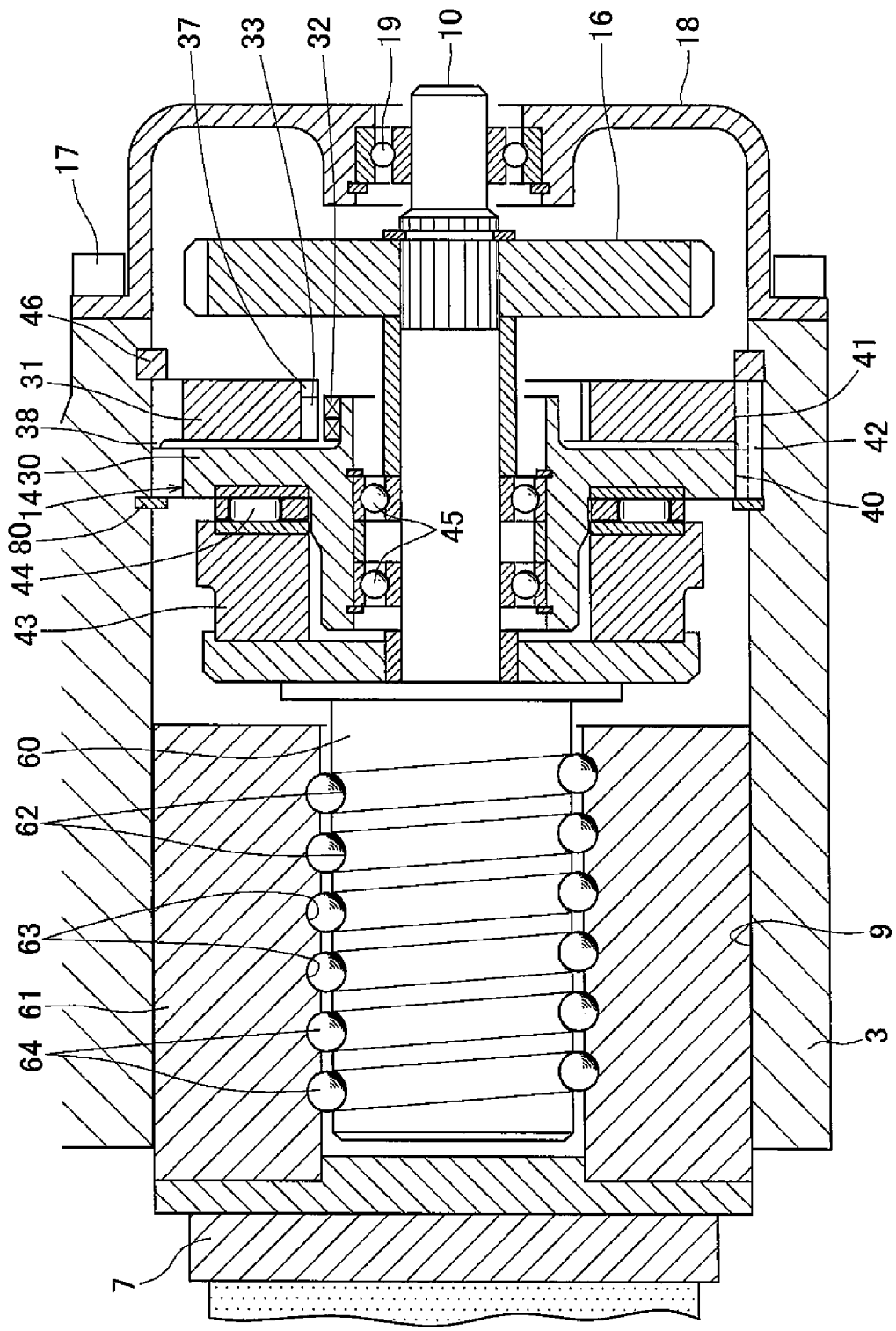
FIG. 9 is an enlarged sectional view of an electric linear motion actuator including a ball-screw as a linear motion device.

By way of example thereof, FIG. 9 shows a linear motion actuator including a ball-screw as the linear motion device. In the following description of FIG. 9, elements corresponding to those of the above embodiment are denoted by identical numerals and their description is omitted.

In FIG. 9, the linear motion actuator comprises a rotary shaft 10, a threaded shaft 60 integral with the rotary shaft 10, a nut 61 surrounding the threaded shaft 60, a plurality of balls 64 disposed between a thread groove 62 formed in the outer periphery of the threaded shaft 60 and a thread groove 63 formed in the inner periphery of the nut 61, a return tube (not shown) through which the balls 64 are returned from the terminal end to the starting end, of the thread groove 63 of the nut 61, and the load sensor 14, which is provided axially rearward of the nut 61.

The nut 61 is received in the mounting hole 9 formed in the opposed piece 3 of the caliper body 6 so as to be rotationally fixed and axially slidable, relative to the caliper body 6. A spacer 43 is provided at the axially rear end of the threaded shaft 60 so as to rotate together with the threaded shaft 60. The spacer 43 is supported by the load sensor 14 through a thrust bearing 44. The load sensor 14 axially supports the nut 61 through the spacer 43, the thrust bearing 44 and the threaded shaft 60, thereby restricting axial rearward movement of the nut 61.

This electric linear motion actuator is configured such that when the rotary shaft 10 rotates, the threaded shaft 60 and the nut 61 are rotated relative to each other, whereby the nut 61 is moved axially forward such that the friction pads 7 and 8 are pressed against the brake disk 2 by the nut 61 and the opposed piece 4 of the caliper body 6, thereby generating braking force. In this state, an axially rearward reaction force is applied to the threaded shaft 60. The reaction force is then transmitted through the spacer 43 and the thrust bearing 44 to the load sensor 14. Thus, in the same manner as in the above embodiment, it is possible to adjust the clearance when the brake is released during normal braking operation, by controlling the rotational angle of the electric motor 15 based on the magnitude of the load detected by the load sensor 14.

Figure 10:
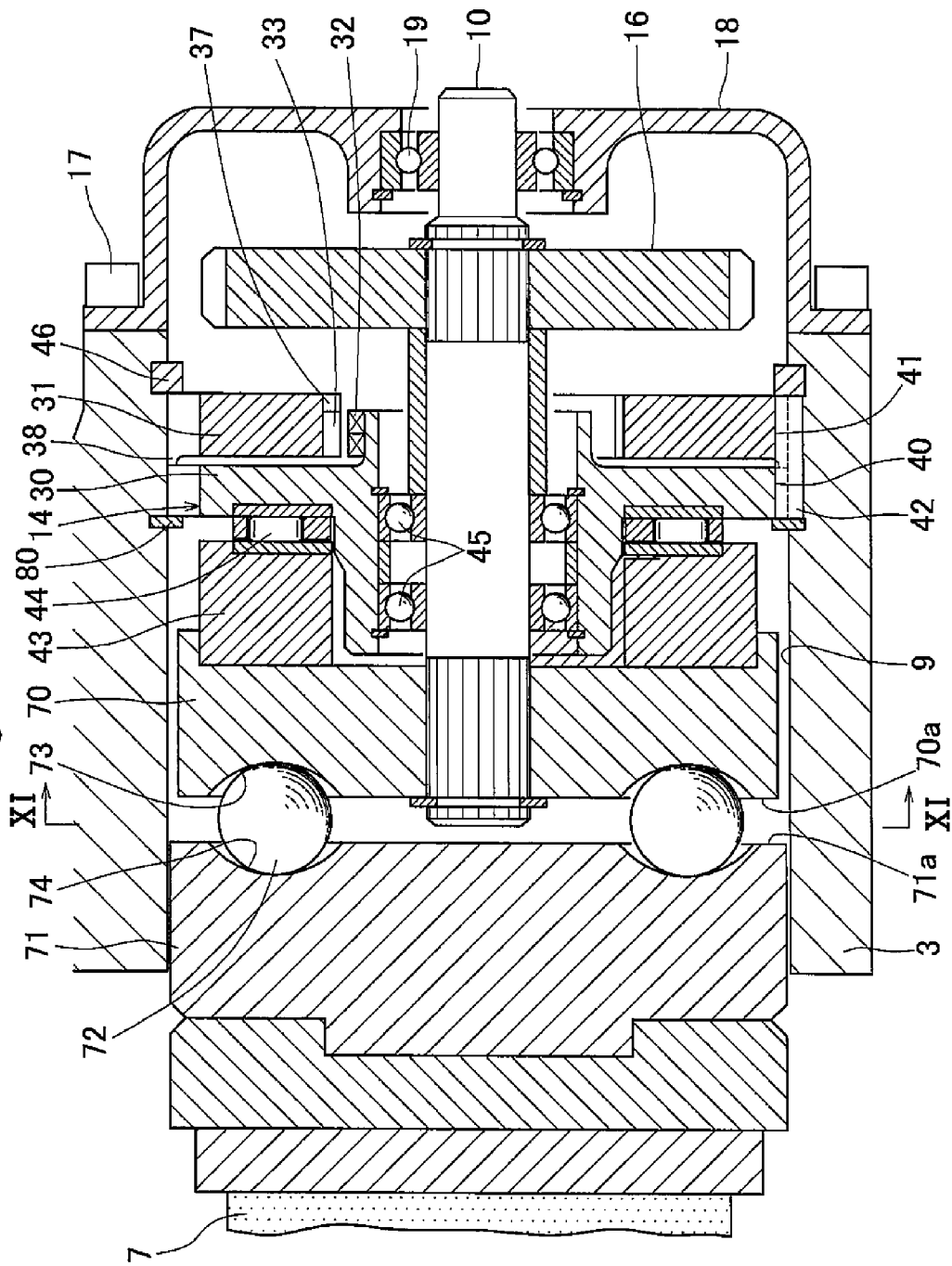
FIG. 10 is an enlarged sectional view of an electric linear motion actuator including a ball-ramp as the linear motion device.

FIG. 10 shows a linear motion actuator including a ball-ramp as the linear motion device.

The linear motion actuator of FIG. 10 includes a rotary shaft 10, a rotary disk 70 rotationally fixed to the outer periphery of the rotary shaft 10, a linear motion disk 71 provided axially forward of the rotary disk 70 and facing the rotary disk 70, a plurality of balls 72 sandwiched between the rotary disk 70 and the linear motion disk 71, and the load sensor 14, which is provided axially rearward of the linear motion disk 71.

The linear motion disk 71 is received in the mounting hole 9 formed in the opposed piece 3 of the caliper body 6 so as to be rotationally fixed and axially slidable, relative to the caliper body 6. A spacer 43 is provided at the axially rear end of the rotary disk 70 so as to rotate together with the rotary disk 70. The spacer 43 is supported by the load sensor 14 through a thrust bearing 44. The load sensor 14 axially supports the rotary disk 70 through the spacer 43 and the thrust bearing 44, thereby restricting axial rearward movement of the rotary disk 70.

Figure 11:
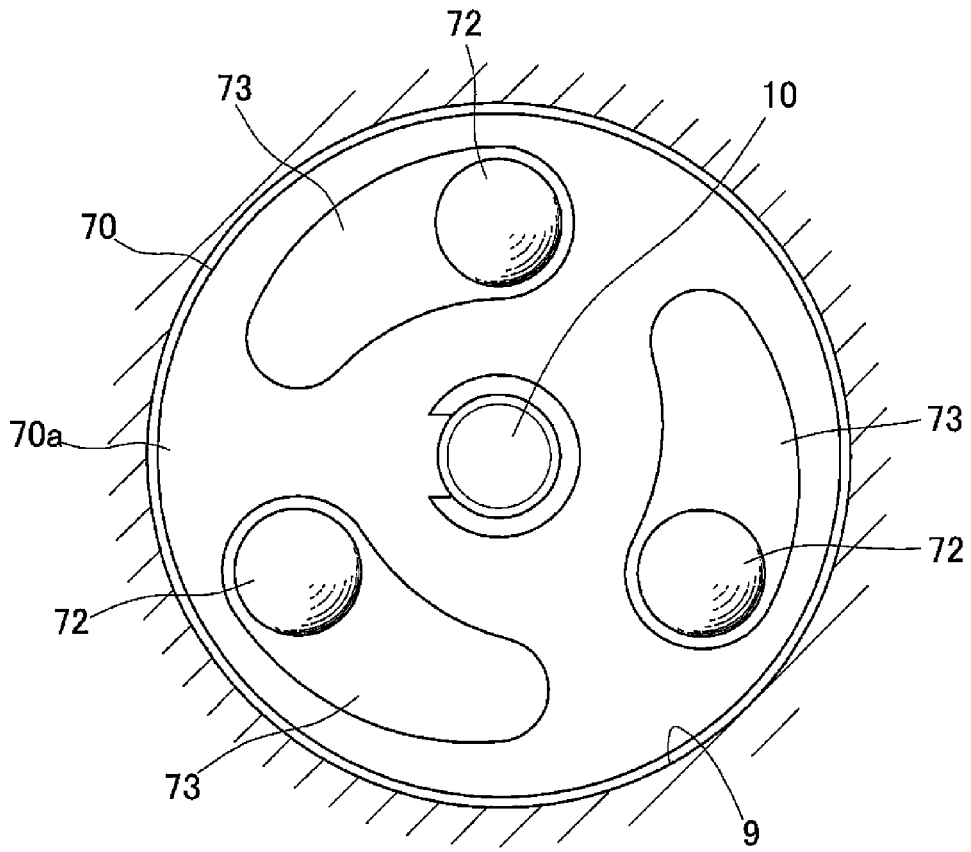
FIG. 11 is a sectional view taken along line XI-XI of FIG. 10.
Figure 12:
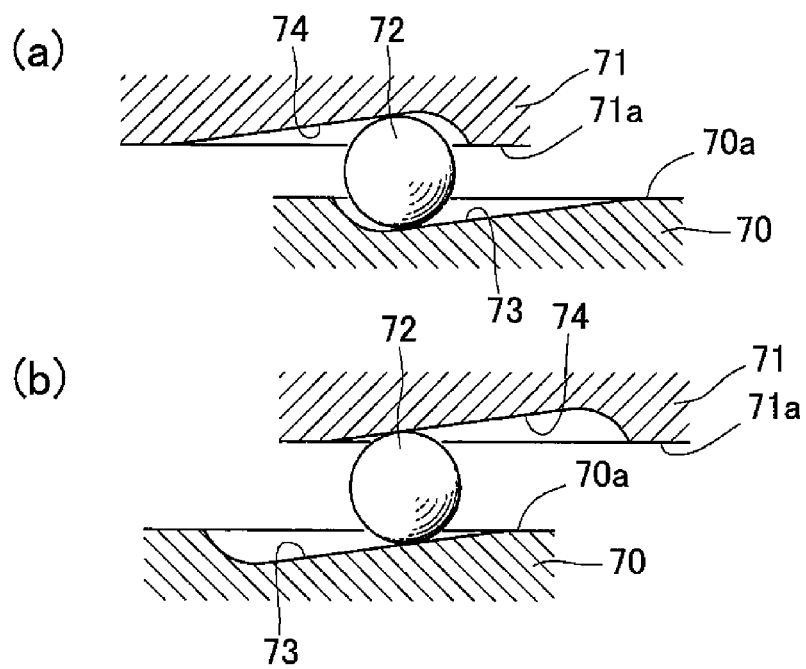
FIG. 12($a$) shows the relationship between a ball and inclined grooves shown in FIG. 10.

As shown in FIGS. 10 and 11, inclined grooves 73 are formed in the opposed surface 70a of the rotary disk 70 facing the linear motion disk 71 such that the depth of each inclined groove 73 gradually decreases in one of the opposite circumferential directions, while inclined grooves 74 are formed in the opposed surface 71a of the linear motion disk 71 facing the rotary disk 70 such that the depth of each inclined groove 74 gradually decreases in the other of the opposite circumferential directions. As shown in FIG. 12(a), the balls 72 are each received between the corresponding pair of the inclined grooves 73 of the rotary disk 70 and the inclined grooves 74 of the linear motion disk 71. As shown in FIG. 12(b), when the linear motion disk 71 rotates relative to the rotary disk 70, the balls 72 roll in the respective pairs of inclined grooves 73 and 74 such that the distance between the rotary disk 70 and the linear motion disk 71 increases.

This electric linear motion actuator is configured such that when the rotary shaft 10 rotates, the linear motion disk 71 and the rotary disk 70 are rotated relative to each other, whereby the linear motion disk 71 is moved axially forward such that the friction pads 7 and 8 are pressed against the brake disk 2 by the linear motion disk 71 and the opposed piece 4 of the caliper body 6, thereby generating braking force. In this state, an axially rearward reaction force is applied to the linear motion disk 71. The reaction force is then transmitted through the spacer 43 and the thrust bearing 44 to the load sensor 14. Thus, in the same manner as in the above embodiment, it is possible to adjust the clearance when the brake is released during normal braking operation, by controlling the rotational angle of the electric motor 15 based on the magnitude of the load detected by the load sensor 14.

DESCRIPTION OF THE NUMERALS

1. Electric linear motion actuator
2. Brake disk
7, 8. Friction pad
10. Rotary shaft
11. Planetary roller
12. Outer ring member
13. Carrier
14. Load sensor
15. Electric motor
22. Helical rib
23. Circumferential groove
30. Flange member
32. Magnetic target
33. Magnetic sensor
37. Temperature sensor
39. Permanent magnet
48. Rotational angle detecting means
50. Electronic control unit
60. Threaded shaft
61. Nut
62, 63. Thread groove
64. Ball
70. Rotary disk
70a. Opposed surface
71. Linear motion disk
71a. Opposed surface
72. Ball
73, 74. Inclined groove

What is claimed is:

1. An electric linear motion actuator comprising:
   a rotary shaft configured to be driven by an electric motor;
   a linear motion device which converts a rotation of the rotary shaft to a linear motion of a linear motion member such that the linear motion member is pressed against an object in an axially forward direction;
   a load sensor for detecting a magnitude of a load with which the linear motion member is pressed against the object;
   a temperature compensator for compensating for an influence of temperature on the load sensor; and
   a clearance controller for adjusting a clearance between the linear motion member and the object to a predetermined value by controlling the electric motor when pressure on the object from the linear motion member is released, wherein the clearance controller is configured to calculate a target rotational angle from a position of the electric motor corresponding to the magnitude of the load detected by the load sensor to a position of the electric motor where the clearance is at the predetermined value, and control the electric motor to rotate the electric motor by the target rotational angle, wherein the load sensor is located axially rearward of the linear motion device so as to axially support the linear motion device through a thrust bearing.

2. The electric linear motion actuator of claim 1, wherein the load sensor comprises a flange member configured to be deflected by a reaction force to the load with which the object is pressed, a magnetic sensor, and a magnetic target which generates magnetic fields, and wherein the magnetic target is arranged such that a position of the magnetic target relative to the magnetic sensor changes when the flange member is deflected.

3. The electric linear motion actuator of claim 2, wherein the magnetic target comprises at least two permanent magnets each magnetized in a direction perpendicular to a relative movement direction in which a position of the magnetic sensor relative to the magnetic target changes, wherein the permanent magnets are arranged such that opposite magnetic poles of the permanent magnets are aligned in the relative movement direction, and wherein the magnetic sensor is located in a vicinity of the boundary between the opposite magnetic poles.

4. The electric linear motion actuator of claim 3, wherein the linear motion device is a planetary roller type linear motion device comprising a plurality of planetary rollers kept in rolling contact with a cylindrical surface on an outer periphery of the rotary shaft, a carrier supporting the planetary rollers so as to be rotatable about respective axes of the planetary rollers while revolving around the rotary shaft, and prevented from axial movement, and an outer ring member surrounding the planetary rollers, wherein the outer ring member has on an inner periphery thereof a helical rib engaged in helical grooves or circumferential grooves formed in outer peripheries of the respective planetary rollers.

5. The electric linear motion actuator of claim 3, further comprising a rotational angle detector for detecting a rotational angle of the electric motor, wherein the clearance controller is configured to rotate the electric motor in a pressure-reducing direction until the rotational angle detected by the rotational angle detector coincides with the target rotational angle.

6. The electric linear motion actuator of claim 2, wherein the linear motion device is a planetary roller type linear motion device comprising a plurality of planetary rollers kept in rolling contact with a cylindrical surface on an outer periphery of the rotary shaft, a carrier supporting the planetary rollers so as to be rotatable about respective axes of the planetary rollers while revolving around the rotary shaft, and prevented from axial movement, and an outer ring member surrounding the planetary rollers, wherein the outer ring member has on an inner periphery thereof a helical rib engaged in helical grooves or circumferential grooves formed in outer peripheries of the respective planetary rollers.

7. The electric linear motion actuator of claim 2, further comprising a rotational angle detector for detecting a rotational angle of the electric motor, wherein the clearance controller is configured to rotate the electric motor in a pressure-reducing direction until the rotational angle detected by the rotational angle detector coincides with the target rotational angle.

8. The electric linear motion actuator of claim 1, further comprising a rotational angle detector for detecting a rotational angle of the electric motor, wherein the clearance controller is configured to rotate the electric motor in a pressure-reducing direction until the rotational angle detected by the rotational angle detector coincides with the target rotational angle.

9. The electric linear motion actuator of claim 8, wherein the rotational angle detector comprises a resolver.

10. The electric linear motion actuator of claim 8, wherein the rotational angle detector comprises a Hall element.

11. The electric linear motion actuator of claim 8, wherein the rotational angle detector comprises a power supply unit configured to estimate the rotational angle of the electric motor based on a voltage between lines through which power is supplied to the electric motor.

12. The electric linear motion actuator of claim 1, wherein the linear motion device is a planetary roller type linear motion device comprising a plurality of planetary rollers kept in rolling contact with a cylindrical surface on an outer periphery of the rotary shaft, a carrier supporting the planetary rollers so as to be rotatable about respective axes of the planetary rollers while revolving around the rotary shaft, and prevented from axial movement, and an outer ring member surrounding the planetary rollers, wherein the outer ring member has on an inner periphery thereof a helical rib engaged in helical grooves or circumferential grooves formed in outer peripheries of the respective planetary rollers.

13. The electric linear motion actuator of claim 12, further comprising a rotational angle detector for detecting a rotational angle of the electric motor, wherein the clearance controller is configured to rotate the electric motor in a pressure-reducing direction until the rotational angle detected by the rotational angle detector coincides with the target rotational angle.

14. The electric linear motion actuator of claim 1, wherein the linear motion device is a ball-screw type linear motion device comprising a threaded shaft configured to rotate together with the rotary shaft, a nut surrounding the threaded shaft, and a plurality of balls disposed between a thread groove formed in an outer periphery of the threaded shaft and a thread groove formed in an inner periphery of the nut.

15. The electric linear motion actuator of claim 14, further comprising a rotational angle detector for detecting a rotational angle of the electric motor, wherein the clearance controller is configured to rotate the electric motor in a pressure-reducing direction until the rotational angle detected by the rotational angle detector coincides with the target rotational angle.

16. The electric linear motion actuator of claim 1, wherein the linear motion device is a ball-ramp type linear motion device comprising a rotary disk configured to rotate together with the rotary shaft, a linear motion disk provided in front of the rotary disk with respect to an axial direction and facing the rotary disk, and balls disposed between inclined grooves formed in a surface of the rotary disk facing the linear motion disk and inclined grooves formed in a surface of the linear motion disk facing the rotary disk.

17. The electric linear motion actuator of claim 16, further comprising a rotational angle detector for detecting a rotational angle of the electric motor, wherein the clearance controller is configured to rotate the electric motor in a pressure-reducing direction until the rotational angle detected by the rotational angle detector coincides with the target rotational angle.

18. The electric linear motion actuator of claim 1, wherein the load sensor comprises a strain sensor provided on the linear motion member.

19. The electric linear motion actuator of claim 18, further comprising a rotational angle detector for detecting a rotational angle of the electric motor, wherein the clearance controller is configured to rotate the electric motor in a pressure-reducing direction until the rotational angle detected by the rotational angle detector coincides with the target rotational angle.

20. An electric brake system configured such that a brake disk is pressed by a linear motion member of an electric linear motion actuator, wherein the electric linear motion actuator is the electric linear motion actuator of claim 1.

* * * * *